United States Patent [19]

Herrin et al.

[11] Patent Number: 4,549,878
[45] Date of Patent: Oct. 29, 1985

[54] APPARATUS AND METHOD FOR ALIGNING AND JOINING INDIVIDUAL BLANKS

[75] Inventors: Melvin B. Herrin, 1156 Mill Rd. Cir., Meadowbrook, Pa. 19046; Henry M. Chandler, Horsham, Pa.

[73] Assignee: Melvin B. Herrin, Meadowbrook, Pa.

[21] Appl. No.: 537,655

[22] Filed: Sep. 30, 1983

[51] Int. Cl.[4] .............................................. B65C 9/08
[52] U.S. Cl. .................................... 493/334; 493/379; 156/556
[58] Field of Search ............... 493/334, 379; 156/544, 156/546, 556

[56] References Cited

U.S. PATENT DOCUMENTS

| 1,293,782 | 2/1919 | Hren et al. |
| 1,721,431 | 7/1929 | Claff et al. |
| 2,006,215 | 6/1935 | Kassekert |
| 2,664,034 | 12/1953 | Fischer .................................. 493/334 |
| 3,429,235 | 2/1969 | Ackley |
| 3,540,970 | 11/1970 | Huntwork .......................... 493/334 |
| 3,558,254 | 1/1971 | Cahill |
| 3,694,295 | 9/1972 | Nichols .............................. 156/556 |
| 4,171,666 | 10/1979 | Swenson et al. |

Primary Examiner—Lowell A. Larson
Attorney, Agent, or Firm—Lerner, David, Littenberg, Krumholz & Mentlik

[57] ABSTRACT

An apparatus and method is described for precision aligning and joining of individual blanks together along an overlapping portion thereof by a bonding agent. The individual blanks are conveyed along the apparatus with their lateral edges retained in grooved guides for aligning and maintaining the blanks in precise registration with one another. The grooved guides are provided with ramped transition sections which displace the overlapping edge portion of the blanks towards each other such that the blanks can be joined together by a bonding agent provided therebetween upon further contact of the overlapping portion of the blanks.

16 Claims, 14 Drawing Figures

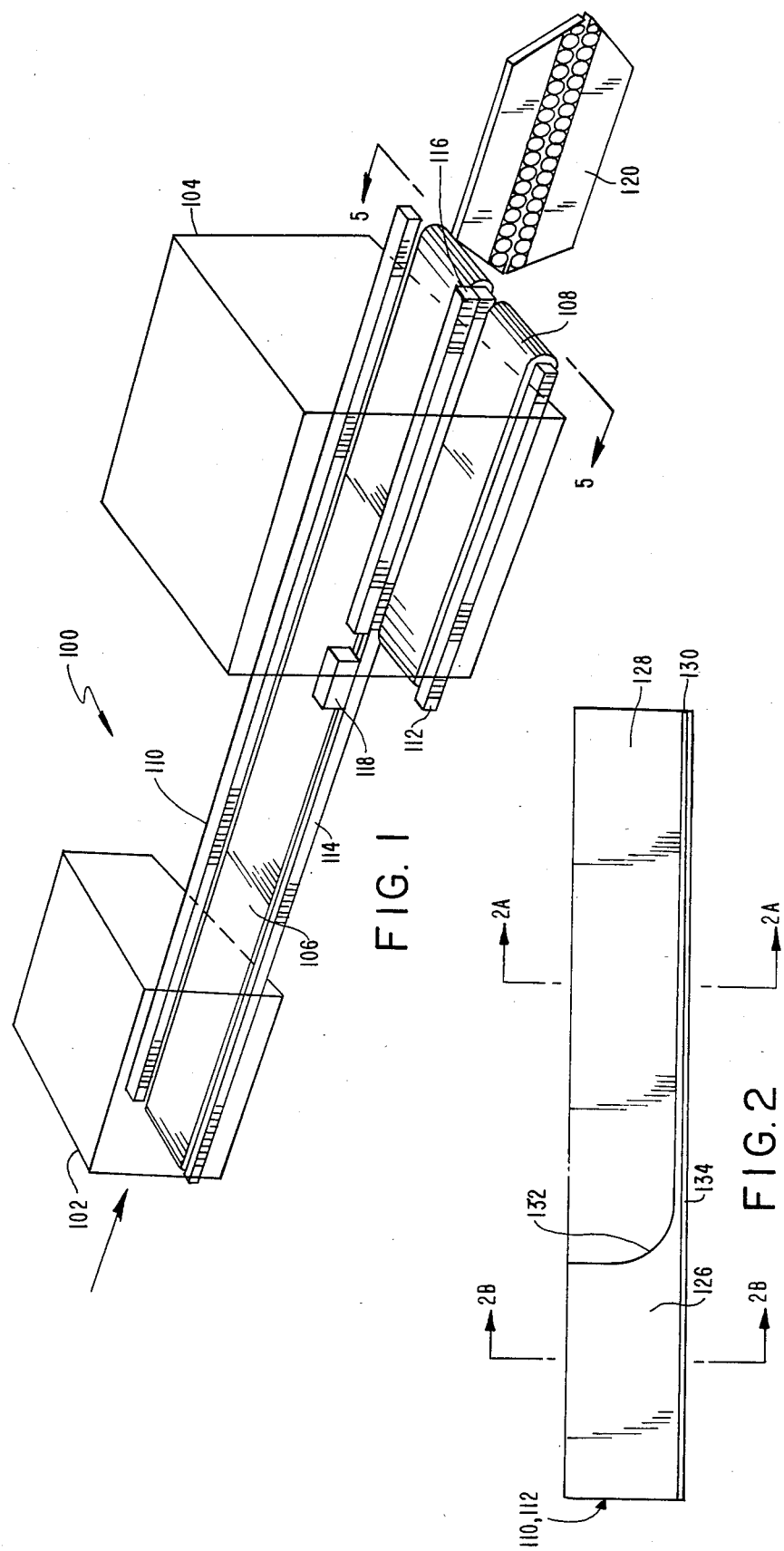

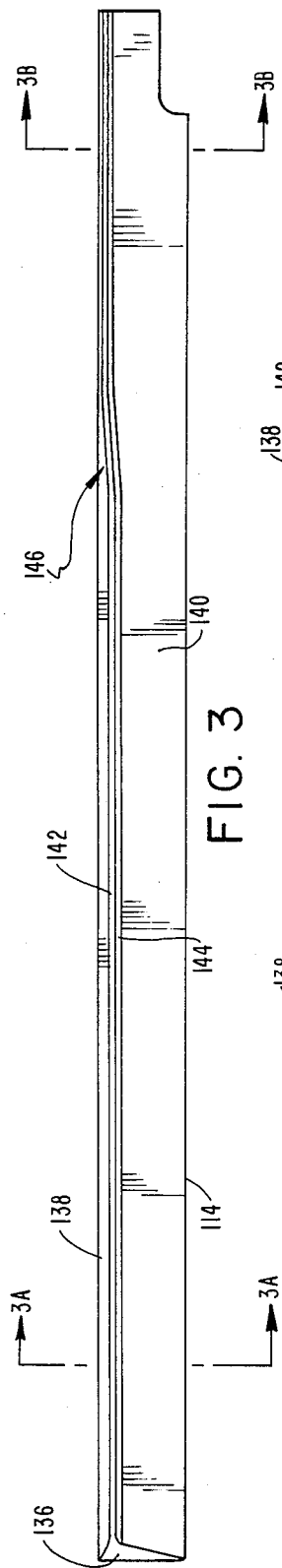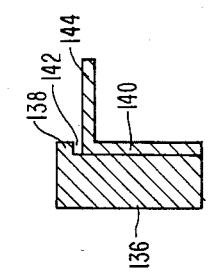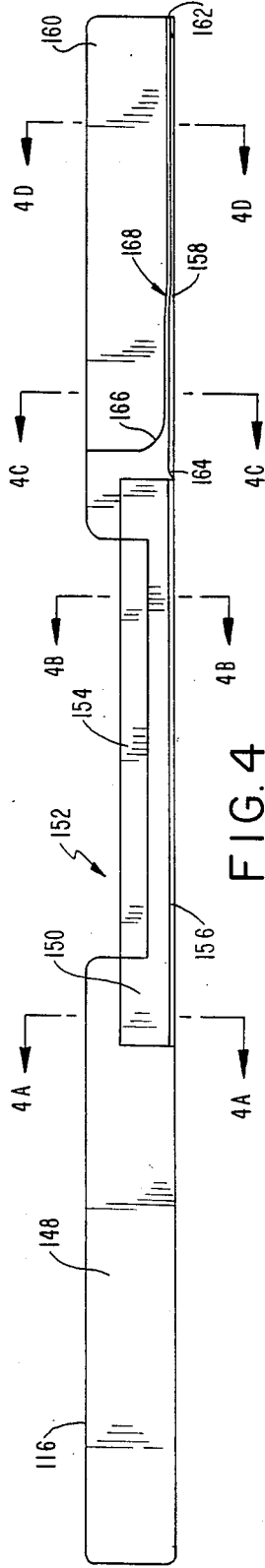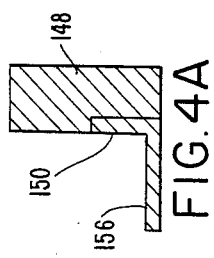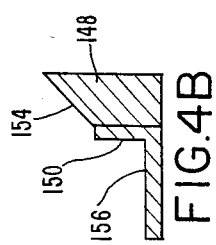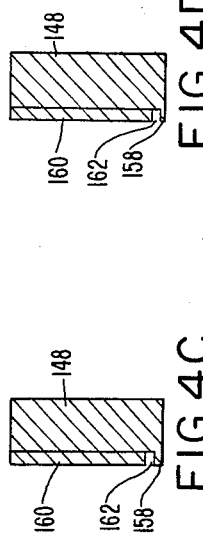

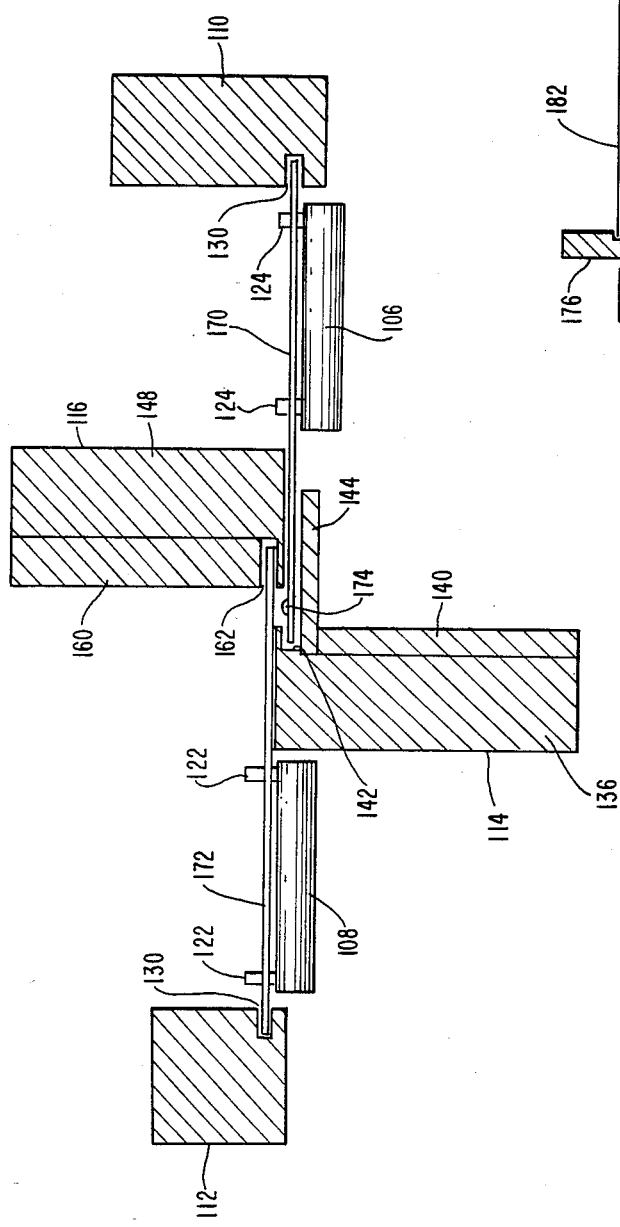
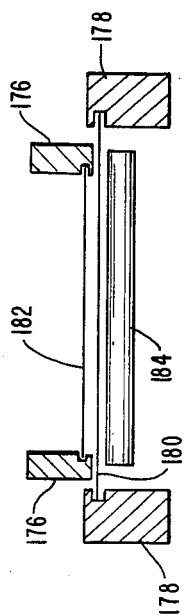
FIG. 5
FIG. 6

APPARATUS AND METHOD FOR ALIGNING AND JOINING INDIVIDUAL BLANKS

BACKGROUND OF THE INVENTION

The present invention relates in general to an apparatus and method for aligning and joining individual blanks together and, more particularly, to such an apparatus and method for aligning individual blanks in overlapping edge relationship by means of grooved lateral edge guides and for joining such blanks together at their overlapping portion by a suitable bonding agent provided therebetween.

The apparatus and method of the present invention may be used to manufacture a variety of products, including containers, file folders and a number of other items for which one piece of rigid or semi-rigid material need be attached to another. In the manufacture of storage and/or package-type containers, e.g., product display packages and the like, such containers are generally constructed from one or more blanks of suitable material folded into the appropriate shape of the desired container by an apparatus constructed for such purpose. Ultimately, such blanks are secured in their folded shape by a bonding agent provided along their mating portions. One such novel container is constructed, in part, from a transparent plastic blank. Such package provides the retailer with a number of advantages over conventional all-cardboard packages, for example, visual display of the product, limited protection of the product from deterioration as, for example, by atmospheric moisture or other causes, pilfer-proof protection, and protection of the product from rough handling both in shipment and by potential customers.

One form of such partially transparent package is constructed to include a rear wall of paperboard, cardboard or the like, which rear wall may have printing and/or decorative material applied to either face thereof with information in regard to the product, instructions for use of the product, the application of a trademark associated with the product, etc. The construction of such a novel partially transparent package initially requires that the transparent plastic blank be bonded along a portion thereof in overlapping edge relationship to a portion of the rear wall. Prior to the bonding operation, however, the transparent plastic blank and rear wall must be appropriately positioned with respect to the rear wall and in registration with any fold lines, openings, printing and/or decoration thereon.

There is known one such apparatus which is suitably adapted to perform the functions of aligning and joining individual blanks together in the manner required in the construction of the above-noted packages. In this regard, illustrative is U.S. patent application Ser. No. 334,585, filed on Dec. 28, 1981 and assigned to the same assignee of the present invention, the subject matter of which is incorporated herein. In accordance with the known apparatus, there is provided a pair of blank feeding devices for individually supplying a first and second blank from a source thereof to be aligned and joined with respect to each other. The feeding devices are adjustably positioned overlying a respective one of a pair of register chain assemblies and are adapted for individually receiving the blanks from a source thereof and for conveying the blanks along substantially parallel paths in a substantially common plane through a portion of the apparatus. An adhesive applicator is positioned between the pair of blank feeding devices for applying a bonding agent on at least a portion of one of the blanks. A longitudinally extending displacing bar is provided for bending a portion of one of the blanks out of the common plane containing the remaining portion of the blank to allow the overlapping of the blanks without interference from the adhesive layer. Further, a pair of curved spaced apart planar alignment guides are provided at the exit ends of the registered chain assemblies to receive therebetween an incoming blank being conveyed therealong and being operative to align the incoming blanks in general relationship with the other blank prior to the subsequent joining of the blanks together upon contact of their overlapping portion.

In this regard, although these guides have proved satisfactory in providing general overlapping alignment between a pair of blanks, such guides have been less satisfactory for use where precise registration of, for example, fold lines are required between individual blanks to be joined. In addition, it has been found that there is a tendency for the sides of the blanks to ride up the vertical face of the guides upon engagement with the lateral edges of the blanks. As a result of this condition, the blanks often partially lift off the registered chain assemblies and lose whatever alignment the blanks may have had, as well as potentially being bent and rendered unsuitable for subsequent use. Furthermore, the guides are arranged for engagement with the blanks only during a relatively short distance of their travel through the apparatus. As a consequence, the blanks, although having once been aligned by the guides, are generally free to shift out of alignment just prior to the bonding of the blanks together by contact of their overlapping portion.

Accordingly, it can be appreciated that there is an unsolved need for an apparatus and method for aligning and joining individual blanks together which is operative for accurately positioning the blanks in overlapping edge relationship and in precise registration with any fold lines, printing and/or decorations thereon, and which maintains such registrations as the blanks are conveyed through the apparatus.

SUMMARY OF THE INVENTION

It is broadly an object of the present invention to provide an apparatus and method for aligning and joining individual blanks together which overcomes or avoids one or more of the foregoing limitations resulting from the use of the above-mentioned known apparatus and which fulfills the requirements of an apparatus and method for aligning and joining individual blanks together in an accurate and uncomplicated manner. Specifically, it is within the contemplation of the present invention to provide an apparatus and method for precision aligning of individual blanks in overlapping edge relationship for precise registration of fold lines and the like, and for joining such blanks together by a suitable bonding agent provided between the overlapping portion thereof.

A further object of the present invention is to provide an apparatus and method for aligning and joining individual blanks together accurately, cheaply and rapidly, and at a minimum of expense.

A still further object of the present invention is to provide an apparatus and method for aligning and joining individual blanks together which prevents the shifting of the blanks out of overlapping alignment and registration with each other prior to their being joined by a suitable bonding agent.

A yet still further object of the present invention is to provide an apparatus and method for aligning and joining individual blanks together wherein such blanks are constructed of various sizes, shapes and materials, for example, plastic, paperboard and the like.

In accordance with the apparatus of the present invention, there is described an apparatus for aligning and joining individual blanks together. The apparatus is constructed of means for supplying first and second blanks to be joined together, means for arranging the blanks in spaced apart relationship, aligning means engaging at least one edge of each of the blanks for aligning the blanks in registration with one another wherein at least a portion of one of the blanks is arranged overlying a portion of the other blank, and means for joining the blanks together at their overlying portion.

In accordance with the apparatus, the aligning means is constructed from a pair of outer guides arranged for engagement with the outer edges of the first and second blanks, an inner lower guide arranged for engagement with the inner edge of the first blank, and an inner upper guide arranged for engagement with the inner edge of the second blank.

Further in accordance with the apparatus, the guides are provided with a longitudinally extending groove arranged for retaining the lateral edges of the first and second blanks therein and wherein the grooves provided in the inner upper and inner lower guides define an overlapping region therebetween whereat the blanks are joined together.

Yet still further in accordance with the apparatus, the inner lower guide is provided with means for displacing a portion of the inner edge of the first blank towards a portion of the inner edge of the second blank and the inner upper guide is provided with means for displacing a portion of the inner edge of the second blank towards a portion of the inner edge of the first blank.

In accordance with the method of the present invention, there is described a method for aligning and joining individual blanks together. The method includes supplying first and second blanks to be joined together, arranging the blanks in spaced apart overlapping edge relationship, conveying the blanks along first and second paths in the overlapping edge relationship, aligning the blanks in registration with one another by engaging at least the overlapping edges of the blanks while the blanks are conveyed along the first and second paths, and joining the blanks together by a bonding agent provided between the overlapping portion thereof.

Further in accordance with the method, the aligning of the blanks includes retaining the overlapping edges of the first and second blanks in spaced apart relationship to maintain the blanks in registration with one another as the blanks are conveyed along the first and second paths.

BRIEF DESCRIPTION OF THE DRAWING

The above description, as well as further objects, features and advantages of the present invention will be more fully understood by reference to the following detailed description of a presently preferred but nonetheless illustrative, method of joining individual blanks together in accordance with the present invention when taken in conjunction with the accompanying drawings, wherein:

FIG. 1 is a diagrammatical perspective view of the apparatus for aligning and joining individual blanks together in accordance with the present invention showing its construction from a pair of blank feeding devices respectively overlying a pair of register chain assemblies and alignment means constructed from a pair of longitudinally extending outer guides, a longitudinally extending inner lower guide, and a longitudinally extending upper guide;

FIG. 2 is a front elevational view of one of the pair of outer guides as shown in FIG. 1 showing a groove arranged for retaining the lateral edges of the blanks therein;

FIGS. 2a–2b are cross-sectional views of the outer guide as shown in FIG. 2;

FIG. 3 is a front elevational view of the inner lower guide as shown in FIG. 1 showing a groove arranged for retaining the overlapping lateral edge of the second blank therein;

FIG. 4 is a front elevational view of the inner upper guide as shown in FIG. 1 showing a groove arranged for retaining the overlapping lateral edge of the second blank therein;

FIGS. 4a–4d are cross sectional views of the inner upper guide as shown in FIG. 4;

FIG. 5 is an elevational view taken along line 5—5 of FIG. 1 showing the guides having a groove therein for engaging both the overlapping and outer edges of the first and second blanks for aligning and maintaining the blanks in overlapping edge registration with one another; and FIG. 6 is a front cross-sectional view showing the guides arranged in accordance with a second embodiment of the present invention for arranging the first and second blanks in overlying relationship.

DETAILED DESCRIPTION OF THE INVENTION

As thus far described, the present invention relates in general to an apparatus and method for precision aligning and joining individual blanks together along an overlapping edge portion thereof by a suitable bonding agent provided therebetween. More specifically, the apparatus of the present invention has been described as adapted to the precision aligning and joining of such blanks in the construction of storage and/or package-type containers, for example, transparent product display packages and the like. As such, the apparatus and method of the present invention are suitably adapted to precisely align and bond together a transparent plastic blank and a rear wall of paperboard, cardboard or the like. As noted, the blanks may be provided with fold lines requiring precise registration with one another, as well as the rear wall may have printing and/or decorative material applied to either face thereof with various types of consumer information such as instructions and/or manufacturer identification, such as trademark, etc.

Referring specifically to the drawings, the apparatus and method of the present invention will now be described in greater detail. The overall construction of the apparatus of the present invention will be described with reference to FIG. 1; a detailed description of the guides of such apparatus will be described with reference to FIGS. 2 through 6; and the specific operation of such apparatus in aligning and joining individual blanks together will be described in greater detail generally with reference to FIG. 5. Referring now to the drawings in which like reference characters represent like elements, there is shown in FIG. 1 a perspective view of the aligning and joining apparatus in accordance with the present invention designated generally by reference character 100. The apparatus 100 is generally constructed from a pair of blank feeding devices 102, 104 adjustably positioned overlying a respective one of a pair of register chain assemblies or conveyors 106, 108, a pair of outer lateral edge guides 110, 112 arranged for engagement with the outer lateral edges of a first and second blank (not shown), an inner lower lateral edge guide 114 arranged for engagement with the inner lateral edge of a first blank, an inner upper lateral edge guide 116 arranged for engagement with the inner lateral edge of a second blank, an adhesive applicator 118 positioned between the pair of blank feeding devices, and a compression carrier assembly 120.

The conveyor 106 is arranged extending in a generally horizontal plane along the longitudinal axis of the apparatus 100. Likewise, the conveyor 108 is arranged adjacent the conveyor 106 and extends in a generally horizontal plane along the longitudinal axis of the apparatus 100. The conveyors 106, 108 are arranged in substantially parallel alignment with one another in their respective horizontal planes to provide substantially parallel paths for conveying through the apparatus 100 a first and second blank to be aligned and joined. As to be further understood, the conveyors 106, 108 are arranged such that a plane containing a first blank being conveyed by conveyor 106 is disposed slightly below a plane containing a second blank being conveyed by conveyor 108. In this regard, two blanks to be aligned and joined together may be arranged overlapping one another without interference from their overlapping portion while being carried along through the apparatus 100 by their respective conveyors 106, 108. However, it is to be understood that the conveyors 106, 108 can be arranged such that the second blank being carried along by conveyor 108 is disposed below the first blank being carried along by conveyor 106. The specific arrangement of the conveyors 106, 108 for carrying along the first and second blanks in planes one disposed above the other to prevent interference of their overlapping portion is more clearly illustrated in FIG. 5.

Adjustably positioned overlying one end of the conveyor 106 is the blank feeding device 102 for individually supplying blanks from a supply thereof to the conveyor 106. The second blank is individually supplied from a source thereof to the conveyor 108 by the blank feeding device 104 which is adjustably arranged overlying one end of the conveyor 108. The blanks being supplied from the blank feeding devices 102, 104 can be constructed from plastic material, paper board, cardboard or the like. Each blank may be provided with one or more fold lines, score lines or other marks or indicia which require precision alignment and registration with similar features provided on the other blank. Thus, individual blanks to be aligned and joined together are supplied to the conveyors 106, 108 from a respective source thereof by the blank feeding devices 102, 104 and conveyed along the apparatus 100 along substantially parallel paths in planes disposed one above the other. An adhesive applicator 118 is positioned between the pair of blank feeding devices 102, 104 adjacent the inner lateral edge of the conveyor 106. The compression carrier assembly 120 is positioned adjacent the terminal ends of the conveyors 106, 108 and extends along the longitudinal axis of the apparatus 100 at a location generally midway between the lateral extents of the conveyors 106, 108. As will be understood, the compression carrier assembly 120 is arranged to engage the overlapping portion of the blanks being aligned and joined by the apparatus 100.

The guides 110, 112, 114, 116 of the present invention are arranged longitudinally extending along the lateral edges of the conveyors 106, 108. Specifically, the outer lateral edge guide 110 is arranged extending along the outer lateral edge of the conveyor 106 and generally coextensive therewith. Likewise, the outer lateral edge guide 112 is arranged extending coextensively along the outer lateral edge of the conveyor 108. The inner lower lateral edge guide 114 is arranged generally coextensive with and extending along the inner lateral edge of the conveyor 106. Likewise, the inner upper lateral edge guide 116 is arranged extending along the inner lateral edge of the conveyor 108 and generally coextensive therewith. Further, as shown, the inner upper lateral edge guide 116 is arranged generally overlying a portion of the inner lower lateral edge guide 114 as clearly shown in FIG. 5.

The construction of the apparatus 100 with specific reference to the components thereof will now be described. The construction and specific manner of operation of the blank feeding devices 102, 104, register chain assemblies or conveyors 106, 108, adhesive applicator 118 and compression carrier assembly 112 are fully described and illustrated in the foregoing copending patent application. For an understanding of the present invention so as to allow one having ordinary skill in the art to practice same, it is sufficient to understand that the blank feeding devices 102, 104 supply individual blanks from a source thereof to an overlying position on the conveyors 106, 108, that the conveyors convey the blanks along substantially parallel paths through the apparatus 100, that the adhesive applicator 118 provides a suitable adhesive to at least a portion of the surface of one of the blanks, and that the compression carrier assembly 120 engages the aligned blanks at their overlapping portion so as to be compressed thereat in joining the blanks together. Thus, various modifications may be made in the construction and operation of the blank feeding devices 102, 104, the conveyors 106, 108, the adhesive applicator 118 and the compression carrier assembly 120 as illustrated and described in the aforesaid patent application without departing from the spirit and scope of the present invention.

Referring now to FIGS. 2 through 4, the detailed construction of the guides 110, 112, 114, 116 will now be described. As shown in FIGS. 2, 2a and 2b, the outer lateral edge guides 110, 112 are constructed to include an L-shaped member 126, a rectangular member 128 having a longitudinally extending groove 130 arranged at the lower edge thereof, and a curved transition section 132 provided between the L-shaped member and the rectangular member. The guides 110, 112 are arranged such that the L-shaped member 126 underlies the blank feeding devices 102, 104 for receiving a blank disposed overlying the horizontal legs 134 thereof. The groove 130 can be machined into the rectangular member 128 or provided by securing a corner notched rectangular member as defined by the dotted lines shown in FIG. 2a to the L-shaped member 126 as shown in FIG. 2b. Other methods of providing a groove 130 in the guides 110, 112 may be devised without departing from the spirit and scope of the present invention.

Referring now to FIGS. 3, 3a and 3b, the construction of the inner lower lateral edge guide 114 will now be described. The guide 114 is constructed from a generally rectangular longitudinally extending lipped member 136 having a protruding lip 138 extending outwardly therefrom adjacent the top edge thereof. A longitudinally extending L-shaped member 140 is secured adjacent one vertical face of the lipped member 136 underlying the lip 138 to form a groove 142 therebetween. The horizontal leg 144 of the L-shaped member 140 extends normal to lipped member 136 to provide a planar support for a portion of the blank when engaged by the guide 114. The groove 142, beginning at the left side of FIG. 3, extends along the guide 114 in a first horizontal plane (see FIG. 3a) and is then disposed into a higher second horizontal plane (see FIG. 3b) by a ramped transition section generally designated by reference character 146. Although the guide 114 has been described as being constructed from two pieces, namely a lipped member 136 and an L-shaped member 140, it is to be understood that the guide may be integrally formed to include the groove 142 and horizontal leg 144.

The guide 114 is arranged longitudinally extending adjacent the inner lateral edge of the conveyor 106, as best shown in FIG. 1. Specifically, the guide 114, as shown in FIG. 3, is arranged adjacent at least that portion of the conveyor 106 which is coextensive with the conveyor 108. The remaining portion of the guide 114 extending from the conveyor 108 to a position underlying the blank feeding device 102 can be constructed similar to the guides 110, 112 as shown and described with respect to FIGS. 2, 2a and 2b. In this manner, individual blanks being supplied from the blank feeding device 102 will have both their lateral edges initially disposed overlying the horizontal leg 134 of the L-shaped member 126 and subsequently engaged by the groove 130 with the assistance of the curved transition section 132. However, it should be appreciated that the left end of the guide 114 may be constructed to include an L-shaped member in the manner described with respect to the outer guides 110, 112 so as to receive a blank being supplied from the blank feeding device 102.

Referring now to FIGS. 4, and 4a-4d, the construction of the inner upper lateral edge guide 116 will now be described. The guide 116 is constructed from a longitudinally extending, generally rectangular lipped member 148. An L-shaped member 150 (see FIG. 4a) is secured to one vertical face of the lipped member 148 at a generally central position thereof underlying an opening 152 provided by a sloped surface 154 (see FIG. 4b). The L-shaped member 150 includes a horizontal leg 156 extending normal to the vertical surface of the guide 148 and underlying the opening 152. The lipped member 148, beginning adjacent the L-shaped member 150 and extending to the right as viewed in FIG. 4, is provided with a lip 158. A generally rectangular member 160 is secured to the vertical face of the lipped member 148 spaced from the lip 158 to provide a groove 162 therebetween. A pair of curved transition sections 164, 166 are respectively provided at one end of the lip 158 and rectangular member 160 to facilitate the engagement of the lateral edge of a blank within the groove 162 as it is conveyed from the L-shaped member 150. The groove 162 extends in one horizontal plane (see FIG. 4c) from adjacent the L-shaped member 150 to a ramped transition section generally designated by reference character 168 to a second horizontal plane (see FIG. 4d) disposed below the first horizontal plane. Although the guide 116 has been described as being constructed separately from lipped member 148 having a lip 158, L-shaped member 150 and rectangular member 160, it is to be understood that the guide may be integrally formed as previously noted with respect to the guide 114.

Further, the groove 130 within the outer guides 110, 112, the groove 142 within the inner lower guide 114 and the groove 162 within the inner upper guide 116 are dimensioned so as to engage and retain therein the lateral edge of a blank being fed from one of the blank feeding devices 102, 104. In this regard, the grooves 130, 142, 162 may be made either smaller or larger in accordance with various thicknesses and material for construction of the various blanks to be aligned and joined together using the apparatus 100 per the method of the present invention.

The guide 116 is arranged adjacent the inner lateral edge of the conveyor 108 generally overlying the guide 114. The opening 152 is arranged underlying the blank feeding device 104 to permit the receiving of blanks being fed from the feeding device onto the conveyor 108 and the horizontal leg 156 of the L-shaped member 150. As thus far described, the apparatus 100 of the present invention is provided with conveyors 106, 108 for transporting a pair of blanks along substantially parallel paths through the apparatus to be aligned and joined together. Coextensive with the conveyors 106, 108 there is provided longitudinally extending lateral edge guides 110, 112, 114, 116 having a groove 130, 142, 162 provided therein for engaging and capturing the lateral edges of the blanks being conveyed by the conveyors 106, 108 so as to align the blanks in precise registration with one another and to maintain such registration prior to their being joined together.

Referring now to FIG. 5, a further description of the arrangement of the guides 110, 112, 114, 116 will now be described with specific reference to the method of the present invention for aligning and joining individual blanks together. A first blank 170 is fed from the blank feeding device 102 and supplied onto the conveyor 106 for engagement with the lugs 124 and for transporting the blank therealong. As the blank 170 is placed onto the conveyor 106, the inner and outer lateral edges of the blank are placed on top of the horizontal leg 134 of the outer lateral edge guide 110 and a corresponding horizontal leg of the inner lower lateral edge guide 114. As the blank 170 is conveyed by the lugs 124 of the conveyor 106, the lateral edges of the blank are engaged by the grooves 130, 142 provided within the guides 110, 114, with the inner lateral edge of the blank being supported by the horizontal leg 144 of the L-shaped member 140. The blank 170 is moved along the conveyor 106 through the apparatus 100 in a plane extending through the grooves 130, 142 of the guides 110, 114. When the blank 170 reaches the adhesive applicator 118, a line of adhesive 174 is deposited onto a portion of the blank adjacent its inner lateral edge. The blank 170 is prevented from skewing or being moved out of its registration by the engagement of its lateral edges within the grooves 130, 142 of the guides 110, 114.

Similarly, a blank 172 is fed from the blank feeding device 104 onto the conveyor 108 and having its outer and inner lateral edges supported by the horizontal leg 134 of the L-shaped member 126 of the guide 112 and the horizontal leg 156 of the L-shaped member 150 of the guide 116. The blank 172 is conveyed along a plane extending through the grooves 130, 162 within the guides 112, 116 by means of the lugs 122. The synchronized timed operation of the conveyors 106, 108 allows the blanks 170, 172 to be positioned adjacent one another in proper longitudinal alignment. As the blank 172 is conveyed along the conveyor 108, its inner and outer lateral edges are engaged by the grooves 130 and 162 of the guides 112, 116 to provide and maintain precise registration of the blank with the blank 170. As shown, guide 116 is positioned overlying and to the right of guide 114 such that the grooves 142, 162 of the guides provide an overlapping portion of the blanks 170, 172 between which the adhesive 174 is provided on the blank 170. As the grooves 130, 162 of the guides 112, 116 lie in a plane disposed above a plane containing the grooves 130, 142 of the guides 110, 114, the blanks 170, 172 are spaced apart to allow their movement by the conveyors 106, 108 without interference from one another at their overlapping portion. The space provided between the blanks 170, 172 at the overlapping portion is sufficient to accomodate a line of adhesive 174 without such adhesive interfering with the bottom surface of the blank 172. The line of adhesive 174 may alternatively be provided on the bottom surface of blank 172, if desired. Thus, the blanks 170, 172 may be aligned in overlapping relationship with one another and in precise registration without interference from the adhesive 174 or engagement with the other blank.

The blanks 170, 172 are further brought together at their overlapping portion by means of the ramped transition sections 146, 168 of the inner lower guide 114 and inner upper guide 116. As clear from FIGS. 3 and 4, as the inner edge of blank 170 is engaged by the ramped transition section 146 of the guide 114, the inner edge is displaced into a plane disposed above the plane containing the remainder of the blank and bringing it closer to the plane containing blank 172. Likewise, as the inner edge of the blank 172 is engaged by the ramped transition section 168 of the guide 116, the inner edge is displaced downward from the plane containing the remainder of the blank and towards the plane containing the overlapping portion of the blank 170. In this manner, the overlapping portion of the blanks 170, 172 are merged closer together in spaced apart overlapping edge relationship by means of the ramped transition sections 146, 168. Although the overlapping edge portion of the blanks 170, 172 have been displaced towards each other by means of the ramped transition sections 146, 168, the blanks are maintained in slight spaced apart relationship to prevent their contact with one another or the line of adhesive 174. For example, the blanks 170, 172 are initially in spaced apart overlapping edge relationship to provide approximately a one-half inch space therebetween while narrowing to approximately a one-quarter inch space therebetween after engagement with the ramped transition sections 146, 168. Although the invention herein has been described as maintaining a space between the blanks 170, 172 at the overlapping edge portion thereof after engagement with the ramped transition sections 146, 168, it is contemplated in accordance with the present invention that the ramped transition sections may merge the overlapping edge portion of the blanks such that contact therebetween is achieved and the blanks are joined together by the line of adhesive 174 provided therebetween.

As the leading edge of the overlapping portion of the blanks 170, 172 exit from the inner lower and inner upper guides 114, 116, the overlapping portion is engaged by the compression carrier assembly 120. The compression carrier assembly 120 engages the blanks 170, 172 at their overlapping portion and compresses the blanks together so as to join the blanks thereat by the line of adhesive 174. However, the blanks 170, 172 may also be joined together using a heat sealing technique such as ultrasonics and the like. The blanks 170, 172 are carried along by the compression carrier assembly 120 for a sufficient time to permit the line of adhesive 174 to dry or cure so as to permanently bond the blanks together in precise registration with one another. Thus, in accordance with the present invention, there has been described a method for aligning and joining individual blanks together. The method generally comprises the supplying of individual blanks to be joined together by means of a bonding agent provided between the overlapping portion thereof. The blanks are arranged in spaced apart relationship by means of a pair of conveyors which convey the blanks along first and second paths in overlapping edge relationship. The blanks are aligned in precise registration with one another by engaging at least the overlapping edges of the blanks by means of guides having grooves therein while the blanks are conveyed along the first and second paths. The overlapping portion of the blanks are merged together by displacing a portion of the inner edge of the first blank towards a portion of the overlapping inner edge of the second blank and displacing a portion of the inner edge of the second blank towards a portion of the overlapping inner edge of the first blank.

Referring to FIG. 6, there is illustrated a first and second pair of lateral edge guides 176, 178 arranged in accordance with a second embodiment of the present invention for aligning a first and second blank 180, 182 in overlying relationship. The guides 176, 178 are constructed in the manner as previously described with respect to the guides 110, 112, 114, 116, wherein each of the guides are provided with a longitudinally extending groove for retaining the lateral edges of the blanks 180, 182. The guides 178 are spaced apart extending along the sides of a conveyor 184 which conveys a first blank 180 from the blank feeding device 102. Arranged inwardly of the guides 178 and overlying the outer edges of the conveyor 184 are the guides 176 for guiding the second blank 182 from the blank feeding device 104. The guides 176, 178 maintain the blanks 182, 184 in precise spaced apart overlying relationship with one another. The blanks 182, 184 may be joined together by a suitable bonding agent provided therebetween in accordance with the method as already described. The blank 182 may be conveyed from the blank feeding device 104 by means of the conveyor 184 or other means known to those skilled in the art. The arrangement of the guides 176, 178 in accordance with the arrangement illustrated in FIG. 6 has specific utility where the blank 180 is provided with a cutout or opening which is to be covered by the second blank 182 in the form of a window. In this regard, the bonding agent may be provided around the periphery of the cutout so as to adhere the second blank 182 in precise registration thereto, and which blank is formed of transparent plastic material.

Although the invention herein has been described with reference to particular embodiments, it is to be understood that these embodiments are merely illustrative of the principals and applications of the present invention. For example, the outer guides 110, 112 could be replaced with roller guides constructed of a plurality of rollers mounted vertically for rotation about their longitudinal axis. Further, the inner lower guide 114 and inner upper guide 116 although having been described as constructed from separate members, may be constructed as a one piece integrally formed center guide for engaging the overlapping edges of the blanks 170, 172. It is to be understood that numerous modifications may be made in the illustrative embodiments and that other arrangements may be devised without departing from the spirit and scope of the present invention as defined by the appended claims.

What is claimed is:

1. An apparatus for aligning and joining individual members together, said apparatus comprising supplying means for supplying upper and lower members to be joined together along a longitudinal joining area, at least one of said members including adhesive means provided on a surface portion thereof within said joining area, joining means for bringing said members together within said joining area, transporting means for transporting said members in spaced-apart relationship between said supplying means and said joining means, said transporting means including lower member end supporting means for supporting an inner end portion of said lower member, and upper member end supporting means for supporting an inner end portion of said upper member overlying said inner end portion of said lower member and said joining area, said lower and upper member end supporting means being constructed and arranged to provide a longitudinally extending opening between the opposing surfaces of said inner end portions of said lower and upper members so that at least said surface portion having said adhesive means thereon and the surface portion on the other member facing said adhesive means are exposed to each other, said opening cooperating with said adhesive means provided on the surface of said inner end portion of one of said members so that said adhesive means is displaced from the opposing surface of said inner end portion of the other of said members within said joining area during the transporting of said lower and upper members toward said joining means to inhibit premature joining of said members, and to inhibit contact between said adhesive means and said lower and upper member end supporting means during transport to said joining means.

2. The apparatus of claim 1, further comprising adhesive applicator means for applying said adhesive means to said surface portion within said joining area.

3. The apparatus of claim 1 further comprising guide means for preventing said inner end portion of said lower member from moving upwards into contact with said inner end portion of said upper member.

4. The apparatus of claim 3, further comprising adhesive applicator means for applying said adhesive means to said surface portion within said joining area.

5. The apparatus of claim 1, wherein said individual members comprise portions of a container blank.

6. The apparatus of claim 5, wherein said transporting means continuously moves said container blank portions to said joining means such that container blanks are continuously produced by said joining means.

7. The apparatus of claim 1, wherein said lower member end supporting means includes first end supporting means for supporting said inner end portion of said lower member at least within said joining area.

8. The apparatus of claim 7 further comprising first guide means cooperating with said first end supporting means for providing a groove therebetween, said groove retaining the inner edge of said lower member so as to maintain the spaced-apart relationship between said inner end portion of said lower member and said inner end portion of said upper member within said joining area.

9. The apparatus of claim 8, wherein said upper member end supporting means includes second end supporting means for supporting said inner end portion of said upper member in spaced-apart relationship from said inner end portion of said lower member within said joining area.

10. The apparatus of claim 9 further comprising second guide means cooperating with said second end supporting means for providing a groove therebetween, said groove retaining the inner edge of said upper member so as to maintain the spaced-apart relationship between said inner end portion of said upper member and said inner end portion of said lower member within said joining area.

11. The apparatus of claim 10 further comprising a lower member end guide for guiding the outer edge portion of said lower member during the transporting of said lower member towards said joining means.

12. The apparatus of claim 11, wherein said lower member end guide includes means cooperating with one another to provide a groove therebetween, said groove retaining the outer edge of said lower member during the transporting of said lower member towards said joining means.

13. The apparatus of claim 12 further comprising an upper member end guide for guiding the outer edge portion of said upper member during the transporting of said upper member towards said joining means.

14. The apparatus of claim 13, wherein said upper member end guide includes means cooperating with one another to provide a groove therebetween, said groove retaining the outer edge of said upper member during the transporting of said upper member towards said joining means.

15. The apparatus of claim 14, wherein said lower member end supporting means includes means for displacing a portion of said inner end portion of said lower member towards a portion of said inner end portion of said upper member.

16. The apparatus of claim 15, wherein said upper member end supporting means includes means for displacing a portion of said inner end portion of said upper member towards a portion of said inner end portion of said lower member.

* * * * *